United States Patent
Saito et al.

[11] Patent Number: 5,942,019
[45] Date of Patent: Aug. 24, 1999

[54] ELONGATING APPARATUS AND METHOD FOR GLASS PREFORM AND FURNACE BODY FOR ELONGATING APPARATUS

[75] Inventors: Tatsuhiko Saito; Tomomi Moriya, both of Yokohama, Japan

[73] Assignee: Sumitomo Electric Industries, Ltd., Osaka, Japan

[21] Appl. No.: 09/057,336

[22] Filed: Apr. 9, 1998

[30] Foreign Application Priority Data

Apr. 11, 1997 [JP] Japan ................................. 9-093468

[51] Int. Cl.⁶ .................................................. C03B 37/07
[52] U.S. Cl. ............................... 65/382; 65/388; 65/392; 65/485; 65/486; 65/491; 65/533; 65/537
[58] Field of Search ............................ 65/381, 382, 384, 65/388, 392, 485, 486, 491, 533, 537

[56] References Cited

U.S. PATENT DOCUMENTS

| | | | |
|---|---|---|---|
| 3,865,564 | 2/1975 | Jaeger et al. | 65/392 |
| 4,331,463 | 5/1982 | Briere et al. | 65/491 |
| 5,316,562 | 5/1994 | Smithgall et al. | 65/384 |
| 5,545,246 | 8/1996 | Lysson et al. | 65/537 |
| 5,676,725 | 10/1997 | Ito et al. | 65/382 |
| 5,755,849 | 5/1998 | Hoshino et al. | 65/381 |

FOREIGN PATENT DOCUMENTS

| | | | |
|---|---|---|---|
| 2383137 | 10/1978 | France | 65/382 |
| 2383138 | 10/1978 | France | 65/382 |
| 56-45843 | 4/1981 | Japan . | |
| 57-092534 | 6/1982 | Japan . | |
| 63-195139 | 8/1988 | Japan . | |
| 4-83726 | 3/1992 | Japan . | |
| 5-70165 | 3/1993 | Japan . | |
| 5-294662 | 11/1993 | Japan | 65/384 |
| 6-239639 | 8/1994 | Japan . | |
| 8-91861 | 4/1996 | Japan . | |
| 8-310827 | 11/1996 | Japan . | |

*Primary Examiner*—Peter Chin
*Assistant Examiner*—Michael P. Colaianni
*Attorney, Agent, or Firm*—Pillsbury Madison & Sutro LLP

[57] ABSTRACT

A furnace body for a glass preform elongating apparatus which makes an elongated body by passing the glass preform through the furnace body and elongating the glass preform while heating the glass preform, the furnace body comprising a furnace core tube shaped like a cylinder through which the glass preform passes and having so adequate length in an axial direction that the elongated body may not bend or distort its form, a heating member disposed at an outer peripheral portion of the furnace core tube, a thermal insulator enveloping the furnace core tube and the heating member from outside in circumferential and axial directions thereof, and a furnace body outer shell holding the thermal insulator therein, wherein a through hole is disposed near the heating member downstream thereof in an advancing direction of the glass preform so as to penetrate through the furnace core tube, thermal insulator, and furnace body outer shell in the direction orthogonal to the furnace core tube.

5 Claims, 8 Drawing Sheets

ELONGATING APPARATUS AND METHOD FOR GLASS PREFORM AND FURNACE BODY FOR ELONGATING APPARATUS

BACKGROUND OF THE INVENTION

1. Field of the Invention

The present invention relates to an elongating apparatus and method for a glass preform, and a furnace body for the elongating apparatus. In particular, it relates to an elongating apparatus or the like for performing precise elongating for making optical fibers and the like.

2. Related Background Art

Known as elongating apparatus for glass preforms for optical fibers and the like are those disclosed in Japanese Patent Application Laid-Open Nos. 4-83726 and 5-70165.

FIG. 6 is an overall schematic view of a vertical resistance furnace elongating apparatus of the same type as the apparatus mentioned above, whereas FIGS. 7 and 8 are respectively schematic and sectional views showing the configuration of its furnace body portion.

As shown in FIG. 6, dummy rods 41 and 42 are respectively attached to both ends of a glass preform 4, and the latter passes through a furnace core tube 11 (see FIGS. 7 and 8) within the furnace body 1 while its parts corresponding to the dummy rods 41 and 42 are respectively held by an upper chuck 7 and a lower chuck 8. As shown in FIGS. 7 and 8, the furnace body 1 has a four-layer structure in which, successively from the inside, the furnace core tube 11, a heater 12, a thermal insulator 13, and a furnace body outer shell 14 are disposed.

Returning to FIG. 6, while the glass preform 4 is heated by the heater 12 (see FIG. 7) within the furnace body 1, the lower chuck 8 is moved downward in the arrowed direction faster than that of the upper chuck 7, thereby increasing the distance between the upper chuck 7 and the lower chuck 8. Consequently, the glass preform 4 held by the chucks 7 and 8 via the dummy rods 41 and 42 is elongated, thus yielding an elongated body 5. Here, a taper portion 6, which is a boundary between the glass preform 4 and the elongated body 5, is preferably positioned within the furnace body 1 and more preferably positioned within the furnace core tube 11 shown in FIG. 7.

If the heat applied to the glass preform is uneven in the circumferential direction thereof, the heated glass will yield differences in viscosity distribution within its transverse cross section. In this case, even when the glass preform is elongated with the same tension, the distribution of amount of expansion in the axial direction of the glass preform becomes uneven in the transverse cross section, whereby the elongated body may bend or distort its form. Also, as a result, the outer diameter distribution of the elongated body in the axial direction may become uneven. In order to prevent these problems, it is necessary for the furnace core tube and furnace body to be made as uniform as possible so that no unevenness occurs circumferentially in the heat applied to the glass preform.

Japanese Patent Application Laid-Open No. 56-45843 discloses a technique for keeping the outer diameter of such an elongated body constant in its axial direction (hereinafter simply referred to as "conventional control technique"). This technique performs feedback control such that the outer diameter of the taper portion of the glass preform while being elongated is measured, and the moving speeds of the upper and lower chucks are changed according to thus measured value, so as to keep the outer diameter of the taper portion constant, thereby maintaining a constant outer diameter of the elongated body in the axial direction.

SUMMARY OF THE INVENTION

The inventor has found that, when the above-mentioned control technique is used for obtaining an elongated body with a desired uniform outer diameter, setting the position for measuring the outer diameter of the taper portion used for feedback control is important.

In the case where the outer diameter measuring position is disposed near the upper end of the taper portion, i.e., near the heater; even when the moving speeds of the chucks are controlled to keep the outer diameter of the upper end of the taper portion constant, the outer diameter may be varied at the taper portion, thereby the outer diameter of the elongated body may become uneven and fluctuation. On the other hand, in the case where the outer diameter measuring position is disposed near the lower end of the taper portion; since the glass preform has almost been cooled at this position and its viscosity has been quite large to be elongated, even if a fluctuation in the outer diameter is detected, it can hardly be corrected.

The above-mentioned Japanese Patent Application Laid-Open No. 56-45843 discloses an example in which an exposed glass preform is directly heated by a burner so as to be processed. In such a case, since the taper portion is exposed, the outer diameter measuring position can be altered easily. However, since it is hard to control cooling of the glass preform, this technique is not easily applicable to cases elongating a glass preform and forming a thin elongated body.

When a vertical resistance furnace such as that mentioned above is employed for making such a thin elongated body, the taper portion as a whole is typically accommodated in the furnace body. Consequently, the outer diameter of the taper portion is hard to measure.

Therefore, it is an object of the present invention to provide an elongating apparatus and method which can make an elongated body having a uniform outer diameter and, in particular, an elongating apparatus and method enabling feedback control by measuring the outer diameter of the taper portion, and a furnace body usable for such an elongating apparatus and method.

In order to achieve the above-mentioned object, the present invention provides a furnace body for a glass preform elongating apparatus which makes an elongated body by passing the glass preform through the furnace body and elongating the glass preform while heating the glass preform, the furnace body comprising a furnace core tube shaped like a cylinder through which the glass preform passes and having so adequate length in an axial direction that the elongated body may not bend or distort its form, a heating member disposed at an outer peripheral portion of the furnace core tube, a thermal insulator enveloping the furnace core tube and the heating member from outside in circumferential and axial directions thereof and a furnace body outer shell holding the thermal insulator therein, wherein a through hole is disposed near the heating member downstream thereof in an advancing direction of the glass preform so as to penetrate through the furnace core tube, thermal insulator, and furnace body outer shell in a direction orthogonal to the furnace core tube.

In the preferred embodiment, the heating member is disposed substantially at a middle position of the furnace body in its longitudinal direction. Wherein the middle portion of the furnace body means a portion extending about ⅓ of the overall length of the furnace body 1. In the furnace body outer shell, it is preferable that cooling water is circulated.

When the furnace body is thus configured, the taper portion of the glass preform is disposed at the level of the through hole. Accordingly, via the through hole, the outer diameter of the taper portion can be measured by various kinds of non-contact type measuring methods. Also, since the taper portion of the glass preform is basically covered with the furnace core tube, the glass preform can be prevented from rapidly cooling down. Consequently, an elongating body having a uniform outer diameter can be made easily.

Preferably, a light-transmittable window material is attached to each of both ends of the through hole from outside so as to seal the through hole. As a result, while the outer diameter of the taper portion can be measured in a non-contact fashion by use of light, the air is prevented from unnecessarily intruding into the furnace core tube from the through hole, whereby the heat distribution within the furnace core tube can be stabilized. And deterioration of the furnace body by unexpected oxidation of oxidizable material such as involving carbons can be prevented.

The furnace body may further comprise a heat insulating member which is inserted into parts of the furnace body outer shell and thermal insulator corresponding to the through hole and has a slit in parallel to a transverse cross section of the furnace core tube orthogonal to the center axis thereof. This configuration is effective in further stabilizing the heat distribution within the furnace core tube.

The elongating apparatus for a glass preform in accordance with the present invention employs this furnace body. Namely, it comprises the furnace body; supplying means for supplying the glass preform into the furnace body; elongating means for elongating the glass preform from the furnace body; a light source, disposed outside one end of the through hole of the furnace body, for irradiating a light beam to the glass preform within the furnace core tube through the through hole so as to scan the glass preform transversely; a photodetector, disposed outside the other end of the through hole, for detecting the light beam emitted through the through hole; and control means for computing an outer diameter of the passing glass preform according to an output signal of the photodetector and controlling respective supplying and elongating speeds of the supplying and elongating means so as to keep the outer diameter constant.

The method of elongating a glass preform in accordance with the present invention using the above-mentioned furnace body comprises the steps of scanning transversely a taper portion of the glass preform being elongated by the light incident from one end of the through hole, measuring an outer diameter of the taper portion by detecting scanning light emitted from the other end of the through hole and controlling the supplying and elongating speeds of the glass preform with respect to the furnace body so as to keep the outer diameter of the taper portion constant.

DETAILED DESCRIPTION OF THE PREFERRED EMBODIMENTS

In the following, preferred embodiments of the present invention will be explained with reference to the accompanying drawings. For convenience of explanation, constituents identical to each other among the drawings will be referred to with numerals identical to each other as much as possible, without their overlapping descriptions being repeated. Each of the depicted constituents is simplified for explanation, and their forms and sizes do not always match those in practice.

In the following explanation, "upstream" and "downstream" refer to those defined along the moving direction of a glass preform. For example, the downstream end of a heater indicates the end of the heater on the outlet side of the glass preform. It corresponds to the lower end of the heater when the glass preform moves from the upper side to the lower side.

Figure 1:
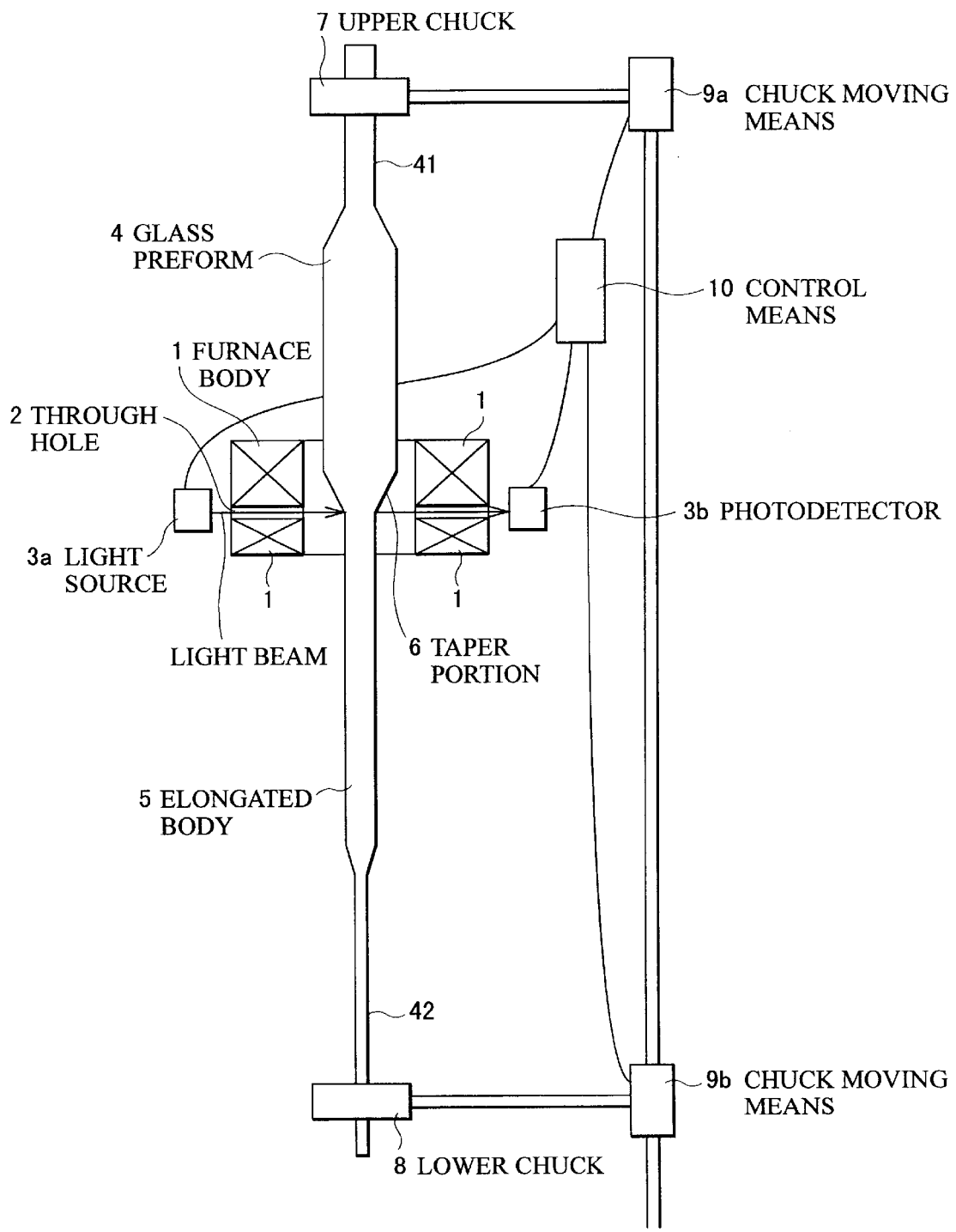
FIG. 1 is a schematic view of an elongating apparatus for a glass preform in accordance with the present invention.
Figure 6:
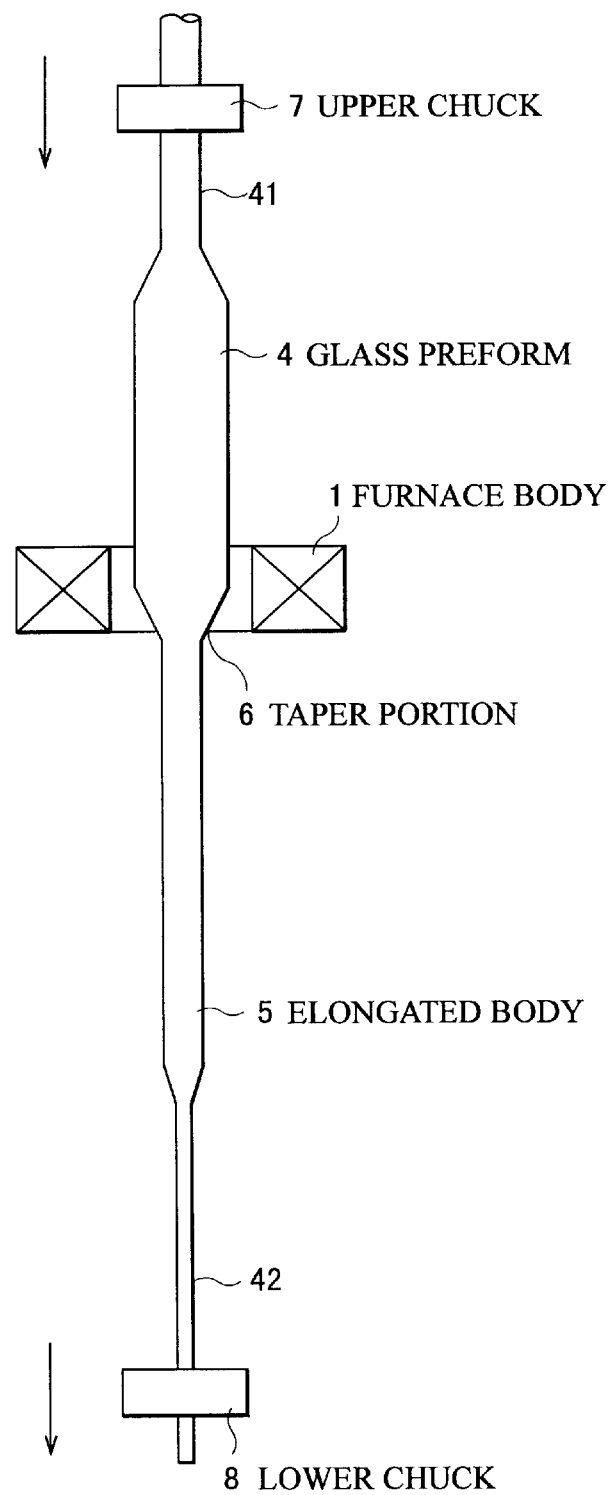
FIG. 6 is a schematic view of a conventional elongating apparatus for a glass preform.

FIG. 1 is a schematic view of a glass preform elongating apparatus in accordance with the present invention. While the basic configuration of this apparatus is identical to that of the conventional vertical resistance furnace elongating apparatus shown in FIG. 6, this basic configuration will be explained here again.

As shown in FIG. 1, this elongating apparatus is an apparatus for elongating a glass preform 4 by stretching it while heating it by a furnace body 1. Though the detailed configuration of the furnace body 1 will be explained later, it is provided with a through hole 2 orthogonal to a passage for passing the glass preform therethrough. Dummy rods 41 and 42 are respectively attached to end portions of the glass preform 4 on the upstream and downstream sides. The dummy rods 41 and 42 are respectively held by upper and lower chucks 7 and 8. Respectively attached to the chucks 7 and 8 are chuck moving means 9a and 9b for moving them in longitudinal directions of the glass preform 4. Consequently, the glass preform 4 is passed through the furnace body 1.

A light source 3a for emitting a laser beam is disposed at one end of the through hole 2 of the furnace body 1, whereas a photodetector 3b is disposed at the other end of the through hole 2 so as to oppose the light source 3a, thereby constituting an outer diameter measuring device 3. The outer diameter measuring device 3 is connected to a control means 10 for controlling operations of the whole apparatus, whereas the control means 10 is also connected to the chuck moving means 9a and 9b.

Figure 2:
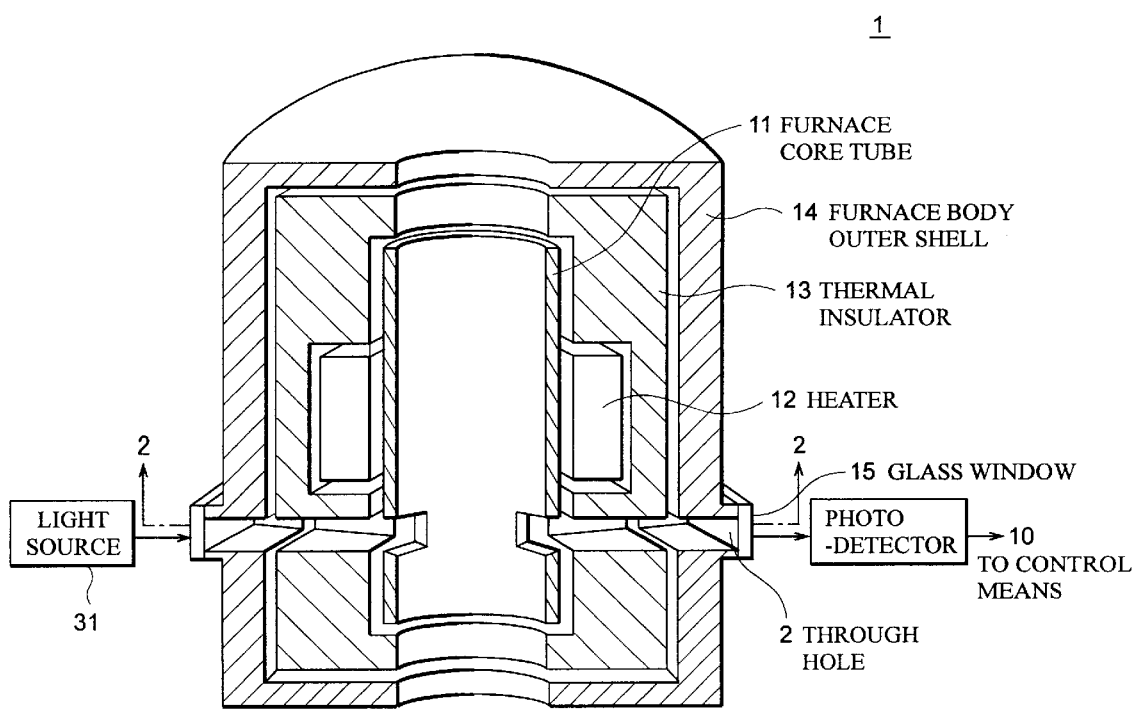
FIG. 2 is a perspective view showing a vertical cross section of a furnace body used in the elongating apparatus of FIG. 1.
Figure 3:
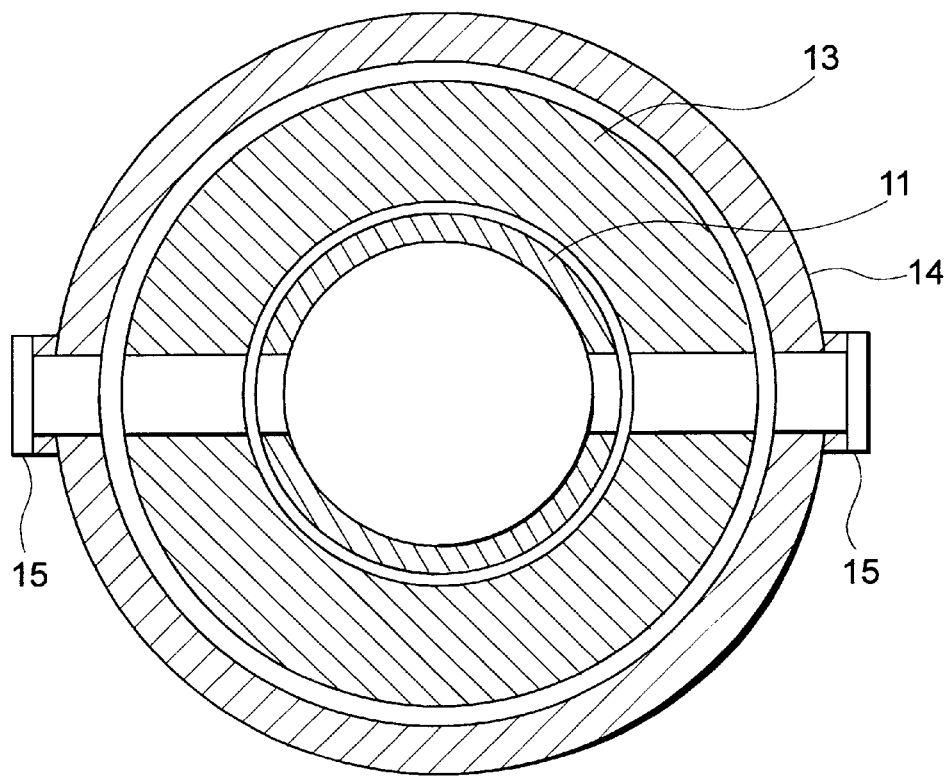
FIG. 3 is a sectional view thereof taken along line II—II.
Figure 7:
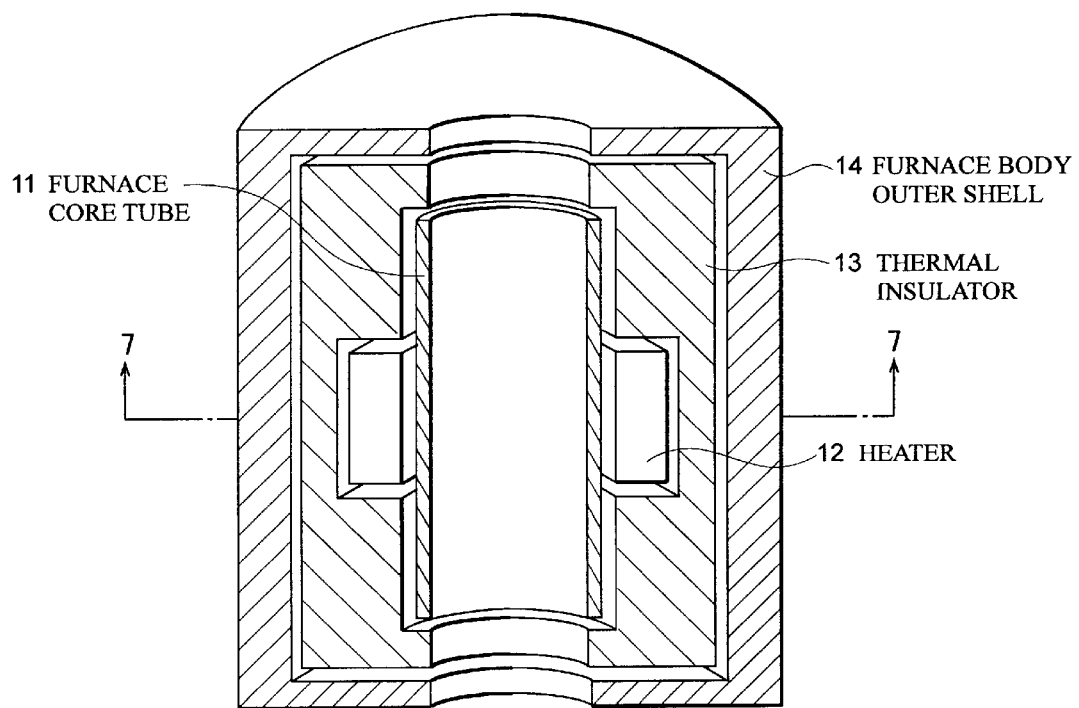
FIG. 7 is a perspective view of a vertical cross section of a furnace body used in the elongating apparatus of FIG. 6.
Figure 8:
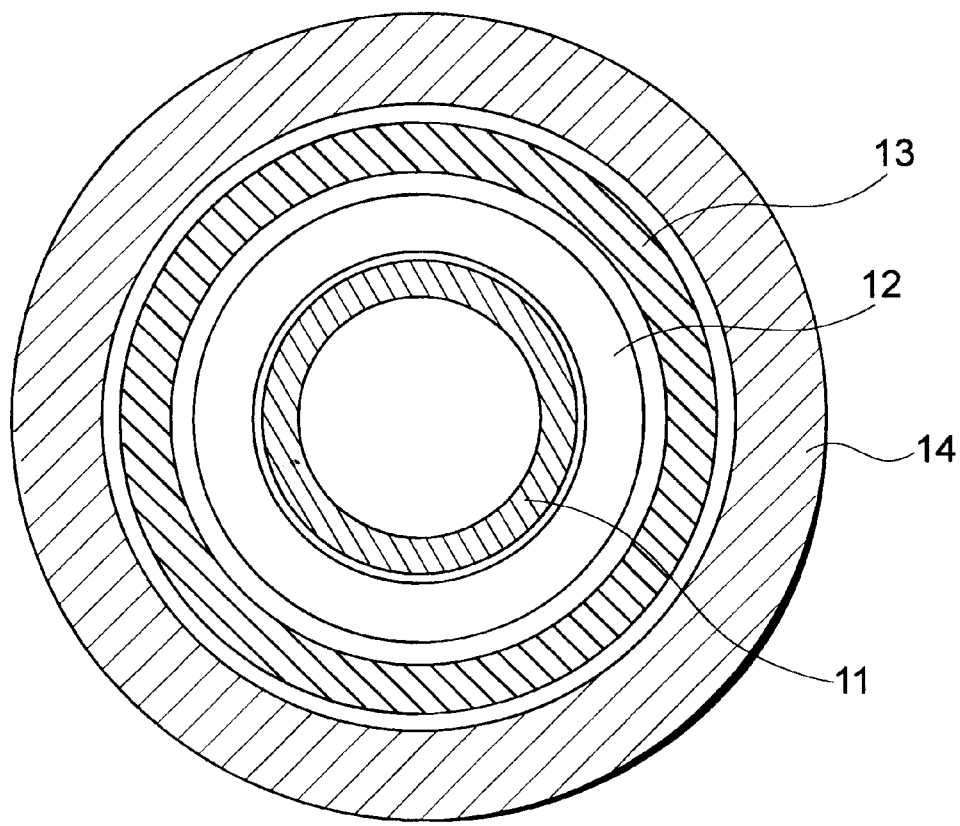
FIG. 8 is a sectional view thereof taken along line VII—VII of FIG. 7.

FIGS. 2 and 3 show the configuration of the furnace body 1. FIG. 2 is a perspective view of a vertical section of the furnace body 1, whereas FIG. 3 is a sectional view thereof taken along line II—II. The furnace body 1 has a four-layer structure in which a furnace core tube 11, a heater 12, a thermal insulator 13 and a furnace body outer shell 14, each shaped like a layer extending circumferentially, are concentrically disposed around the passage for passing the glass preform 4 therethrough. Among them, the heater 12 is disposed substantially at the middle portion of the furnace core tube 11 in its longitudinal direction. These members are configured substantially the same as those in the conventional furnace body shown in FIGS. 7 and 8. The characteristic feature of the furnace body 1 in accordance with the present invention lies in that the through hole 2 which is orthogonal to the passage for the glass preform 4 penetrates through the whole furnace body 1 at near the lower end of the heater 12. The through hole 2 is located at the similar level which the taper portion 6 is located. Glass windows 15 are attached to the furnace body outer shell 14 so as to seal both outer ends of the through hole 2. Through this hole 2 and glass windows 15, the taper portion 6 is visible from the outside the furnace body 1.

As mentioned above, it is necessary for the furnace core tube 11 and the furnace body 1 to fully cover and non-contact the taper portion of the glass preform 4 so that the elongated body may not bend or distort its form. As a result of studies concerning various kinds of glass preforms, the inventor has found that, in a typical vertical resistance furnace, the region of a glass preform (corresponding to the taper portion) softened to such an extent that the glass preform can be elongated within the range extending from the downstream end of the heater to about 300 mm downstream thereof. In order to securely keep the heat in this region, it is necessary for the furnace core tube 11 to cover this region as a whole, while it is required for the furnace body 1 to cover the range extending from the downstream end of the heater to about 600 mm downstream thereof.

Here, in the case where the outer diameter measuring device 3 configured as mentioned above is used for measuring the outer diameter of the glass preform 4, while it is necessary for the through hole 2 of the furnace body 1 to have a size in its circumferential direction not smaller than the outer diameter of the glass preform 4, it is sufficient for the through hole 2 to have a size in its axial direction corresponding the beam width of the laser beam. Even in view of accuracy and ease in processing, a length of several mm in the axial direction is enough. The inventor has confirmed that, when the axial length of the through hole 2 is not greater than 30 mm, the heat distribution does not become uneven within the furnace body 1, whereby the elongated body is prevented from being distorted or bent.

Figure 4:
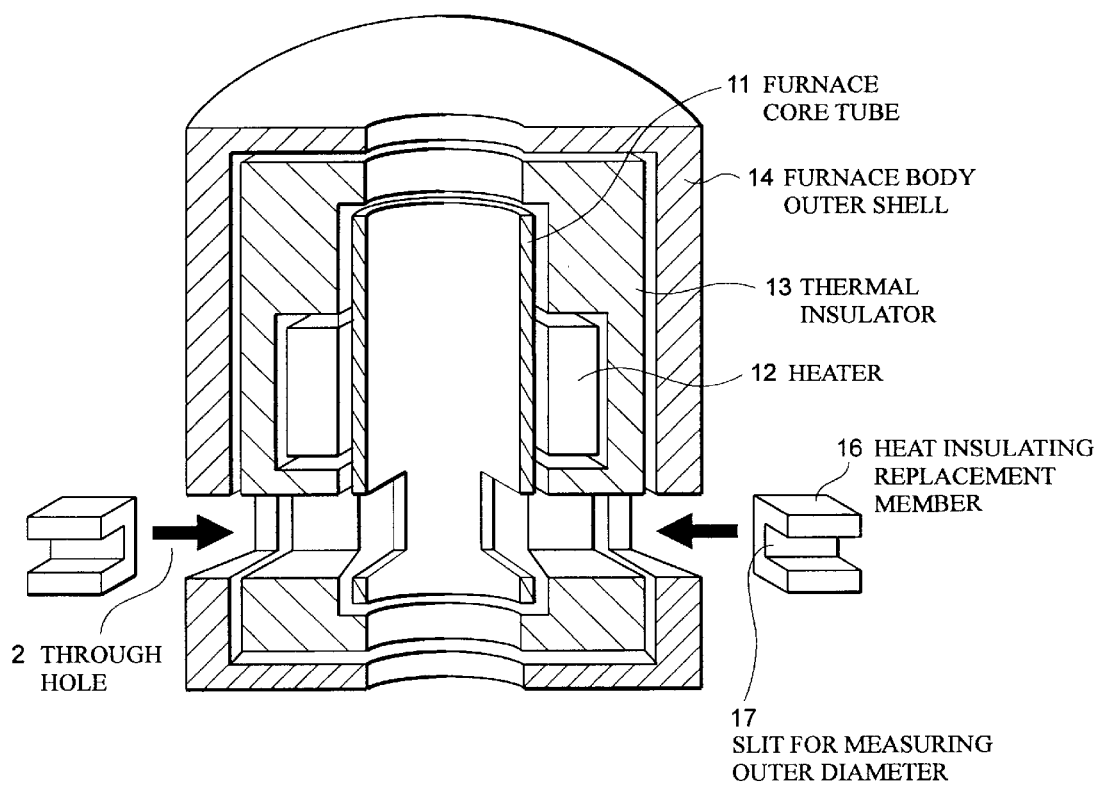
FIG. 4 is a perspective view showing a vertical cross section of another furnace body for an elongating apparatus for a glass preform in accordance with the present invention.

Preferably, the through hole 2 is disposed near the optimal measuring position for the taper portion. This optimal measuring position, as experimentally determined by the inventor, is generally located at a position downstream of the downstream end of the heater by 50 to 170 mm, though variable depending on the outer diameter of the glass preform before elongating, the outer diameter of the elongated body, the heater temperature, the inner diameter of the furnace core tube, and the like. Further, it has been found that, under a typical operating condition, it exists within the range approximately 70 to 120 mm downstream from the downstream end of the heater. In cases where various kinds of glass preforms are needed to be processed or the operating condition has to be changed, it is difficult for the through hole 2 to include the optimal measuring position under all the conditions. Accordingly, as shown in FIG. 4, the through hole 2 encompassing the range where the optimal measuring position can be included may be provided, and a heat insulating replacement member 16 may be inserted at a part corresponding to the furnace outer shell 14 and thermal insulator 13. The heat insulating replacement member 16 is formed with a slit 17 for transmitting therethrough the laser beam of the outer diameter measuring device 3. As the width of the slit 17 in the axial direction of the furnace body 1 is set to several mm, the heat distribution within the furnace core tube 11 can be held so as not to generate unevenness. When several kinds of heat insulating replacement members 16 respectively having slits 17 with different axial positions are prepared so as to be replaced in conformity to the optimal measuring position, the position for measuring the outer diameter of the taper portion can be adjusted easily.

Figure 5:
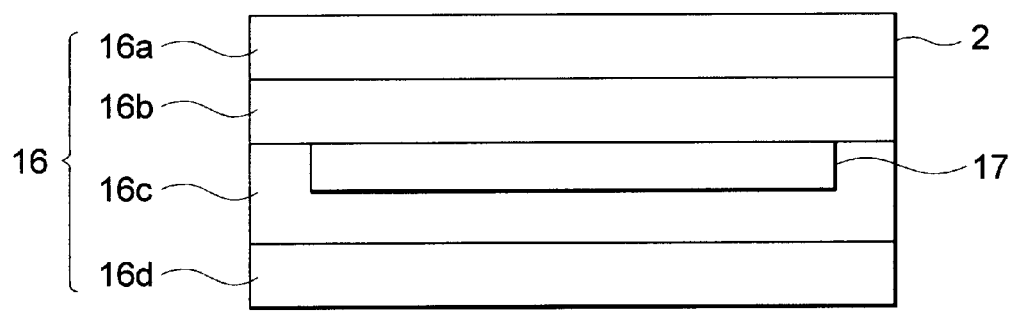
FIG. 5 is an explanatory view showing a state where a heat insulating replacement member for the furnace body of FIG. 4 is inserted into a through hole thereof.

Further, as shown in FIG. 5, with a configuration in which heat insulating replacement members 16*a*, 16*b*, and 16*d* each having no slit 17, and a heat insulating replacement member 16*c* with a slit 17 are combined together, the axial position of the slit 17 can be adjusted easily, whereby the position for measuring the outer diameter of the taper portion can be adjusted more easily.

In the following, operations of the elongating apparatus in accordance with the present invention will be explained. While the glass preform 4 is heated as being passed through the furnace body 1, the lower chuck 8 is moved downward faster than the upper chuck 7, so as to elongate the glass preform 4, thereby yielding an elongated body 5. Here, the taper portion 6 of the glass preform 4 is irradiated with the laser beam from the light source 3*a* through the through hole 2. The laser beam is irradiated as to scan the taper portion 6 transversally. On the other hand, the photodetector 3*b* is disposed outside the opposite end of the through hole 2 facing the light source 3*a*. The photodetector 3*b* detects the laser beam that is not blocked by the taper portion 6. When the laser beam impinges on the taper portion 6, the output of the photodetector 3*b* decreases; otherwise, the laser beam is directly made incident on the photodetector 3*b*, thereby increasing the output of the latter. When the laser beam is scanned at a predetermined timing, the outer diameter of the taper portion 6 can be computed from the period of time in which the output is lowered. The control means 10 computes the outer diameter from the output of the photodetector 3*b* and controls the moving speeds of the chuck moving means 9*a* and 9*b* so as to keep the outer diameter at a desired value. Specifically, when the outer diameter is larger, the relative speed of the downstream chuck moving means 9*b* with respect to the upstream chuck moving means 9*a* is increased; whereas, when the outer diameter is smaller, by contrast, the relative speed of the downstream chuck moving means 9*b* with respect to the upstream chuck moving means 9*a* is decreased. Consequently, the outer diameter of the resulting elongated body 5 is kept substantially constant, whereby a uniform elongated body can be made.

It is due to the fact that, in the present invention, the outer diameter in the vicinity of the heater, i.e., that of the middle part of the taper portion, can be measured accurately, while the furnace core tube protects the whole taper portion including the measuring position from cooling down.

The inventor elongated glass preforms by each of the elongating apparatus in accordance with the present invention and a conventional elongating apparatus, and compared the resulting elongated bodies with each other in terms of quality. In the following, the results of comparison will be explained.

Here, the inner diameter of each furnace core tube was set to 200 mm. While the part of the elongating apparatus in accordance with the present invention extending from the downstream end of the heater to 600 mm downstream thereof was covered with the furnace body, the furnace body in the conventional elongating apparatus only covered the part extending from the downstream end of the heater to 60 mm downstream thereof. The elongating apparatus in accordance with the present invention was formed with a through hole having a width of 150 mm in its circumferential direction located at a part whose distance from the downstream end of the heater ranges from 60 to 130 mm. Inserted therein was a heat insulating replacement member having a slit with a width of 30 mm at a predetermined position in its axial direction.

Result of Comparison 1

Glass preforms each having an outer diameter of 150 mm were used for making elongated bodies each having a final outer diameter of 70 mm. Each diameter measuring position for feedback control was set 110 mm downstream the downstream end of the heater. In each case, the heater temperature was controlled within the range of 1,900° C. to 2,000° C.

The elongated body obtained by use of the elongating apparatus in accordance with the present invention yielded a final diameter of 70±1 mm with its cross section keeping substantially a perfect circle state. By contrast, in the case where the conventional elongating apparatus was used, the cross section of the elongated body became elliptical with a major axis of 71±1 mm and a minor axis of 70±1 mm.

Result of Comparison 2

Glass preforms each having an outer diameter of 70 mm were used for making elongated bodies each with a final outer diameter of 30 mm. Each diameter measuring position for feedback control was set 80 mm downstream the downstream end of the heater. In each case, the heater temperature was controlled within the range of 1,800° to 1,900° C.

The elongated body obtained by use of the elongating apparatus in accordance with the present invention yielded a final diameter of 30±0.5 mm with its cross section keeping substantially a perfect circle state. By contrast, in the case where the conventional elongating apparatus was used, the cross section of the elongated body became elliptical with a major axis of 30±1 mm and a minor axis of 29±1 mm.

From these results, it has been confirmed that an elongated body having a uniform outer diameter can be securely made by feedback control when the elongating apparatus in accordance with the present invention is used.

The furnace body in accordance with the present invention can be made with approximately the same cost and labor as those of the conventional furnace body.

In the furnace body in accordance with the present invention, while the taper portion of the glass preform is covered with the furnace body, the outer diameter of the taper portion can be measured from the outside of the furnace body. Accordingly, in the elongating apparatus and method in accordance with the present invention employing this furnace body, by the feedback control using thus measured diameter, an elongated body with less outer diameter fluctuation without bending or distortion can be obtained.

When the outer diameter of the taper portion in the glass preform is optically measured, each of both ends of the through hole is preferably sealed with a light-transmittable window material. As a result, the air is prevented from unnecessarily intruding therein, whereby the heat distribution within the furnace core tube can be kept from becoming uneven. And deterioration of the furnace body by unexpected oxidation of oxidizable material such as involving carbons can be prevented.

In particular, when a heat insulating replacement member is used, while thermal insulation is maintained, the optimal position for measuring the outer diameter of the glass preform to be elongated can be changed easily, thus making it possible to effect more secure feedback control.

Without being restricted to optical measurement, various kinds of non-contact type measuring methods can be used for measuring the outer diameter of the taper portion of the glass preform. In view of the disclosure of this specification, it would be obvious for one skilled in the art to employ these measuring methods in the elongating apparatus using the furnace body in accordance with the present invention, and it would be clear that these modifications are included within the scope of the present invention.

What is claimed is:

1. A furnace body for a glass preform elongating apparatus which makes an elongated body by passing said glass preform through said furnace body and elongating said glass preform while heating said glass preform, said furnace body comprising:

a furnace core tube shaped like a cylinder through which said glass preform passes and having an adequate length in an axial direction so that said elongated body does not bend or distort;

a heating member disposed at an outer peripheral portion of said furnace core tube;

a thermal insulator enveloping said furnace core tube and said heating member from outside in circumferential and axial directions thereof; and a furnace body outer shell holding said thermal insulator therein;

wherein a first hole and a second hole penetrate through said furnace core tube, thermal insulator, and furnace body outer shell in a direction orthogonal to said furnace core tube, said first hole and said second hole are diagonally opposed to one another and are positioned downstream of said heating member by a distance of about 50 to 170 mm.

2. The furnace body according to claim 1, further comprising a light-transmittable window material attached to ends of said first and second through holes located outside said outer shell so as to seal said first and second through holes.

3. The furnace body according to claim 1, further comprising a heat insulating member which is inserted into said first and second through holes, said heat insulating member having a slit parallel to a transverse cross section of said furnace core tube and said slit is orthogonal to a center axis of said furnace core tube.

4. An elongating apparatus for a glass preform, said elongating apparatus comprising:

a furnace body comprising:

a furnace core tube shaped like a cylinder through which said glass preform passes and having an adequate length in an axial direction so that said elongated body does not bend or distort;

a heating member disposed at an outer peripheral portion of said furnace core tube;

a thermal insulator enveloping said furnace core tube and said heating member from outside in circumferential and axial directions thereof; and a furnace body outer shell holding said thermal insulator therein;

wherein a first hole and a second hole penetrate through said furnace core tube, thermal insulator, and furnace body outer shell in a direction orthogonal to said furnace core tube, said first hole and said second hole are diagonally opposed to one another and are positioned downstream of said heating member by a distance of about 50 to 170 mm;

a supplying means for supplying said glass preform into said furnace body;

an elongating means for elongating said glass preform from said furnace body;

a light source, disposed outside of said furnace body outer shell at said first through hole of the furnace body, for irradiating a light beam, to said glass preform within said furnace core tube, through said first through hole and for scanning said glass preform transversely by said light beam;

a photodetector, disposed outside of said furnace body outer shell at said second through hole, for detecting said light beam emitted through said second through hole; and a control means for computing an outer diameter of said glass preform according to an output signal of said photodetector and controlling respective supplying and elongating speeds of said supplying and elongating means so as to keep said outer diameter constant.

5. A method of elongating a glass preform comprising the steps of:

supplying said glass preform into a heating furnace which heats and softens said glass preform successively from one end of said glass preform said furnace comprises: a furnace core tube shaped like a cylinder through which said glass preform passes and having and adequate length in an axial direction so that said elongated body does not bend or distort; a heating member disposed at an outer peripheral portion of said furnace core tube; a thermal insulator enveloping said furnace core tube and said heating member from outside in circumferential and axial directions thereof, and a furnace body outer shell holding said thermal insulator therein; wherein a first hole and a second hole penetrate through said furnace core tube, thermal insulator, and furnace body outer shell in a direction orthogonal to said furnace core tube, said first hole and said second hole are diagonally opposed to one another and are positioned downstream of said heating member by a distance of about 50 to 170 mm, a supplying means for supplying said glass preform into said furnace body; an elongating means for elongating said glass preform from said furnace body; a light source, disposed outside of said furnace body outer shell at said first through hole of the furnace body, for irradiating a light beam, to aid glass preform within said furnace core tube, through said first through hole and for passing through said glass preform transversely by said light beam; a photodetector, disposed outside of said furnace body outer shell at said second through hole, for detecting said light beam emitted through said through hole; and a control means for computing an outer diameter of said glass preform according to an output signal of said photodetector and controlling respective supplying and elongating speeds of said supplying and elongating means so as to keep said outer diameter constant;

elongating said glass preform, with elongated means, by setting an elongating speed of said glass preform from said heating furnace faster than a supplying speed of said glass preform into said heating furnace;

scanning transversely a middle position of a taper portion of said glass preform being elongated with light, wherein the middle position is located at about 50–170 mm downstream from a downstream end position of a heating member of said heating furnace;

measuring an outer diameter of said taper portion at the middle position by detecting said light emitted; and controlling said supplying and elongating speeds of said glass preform with respect to said furnace body so as to keep said outer diameter of said taper portion at the middle position constant.

* * * * *